F. DUNN.
Barley Fork.
No. 100,382. Patented March 1, 1870.
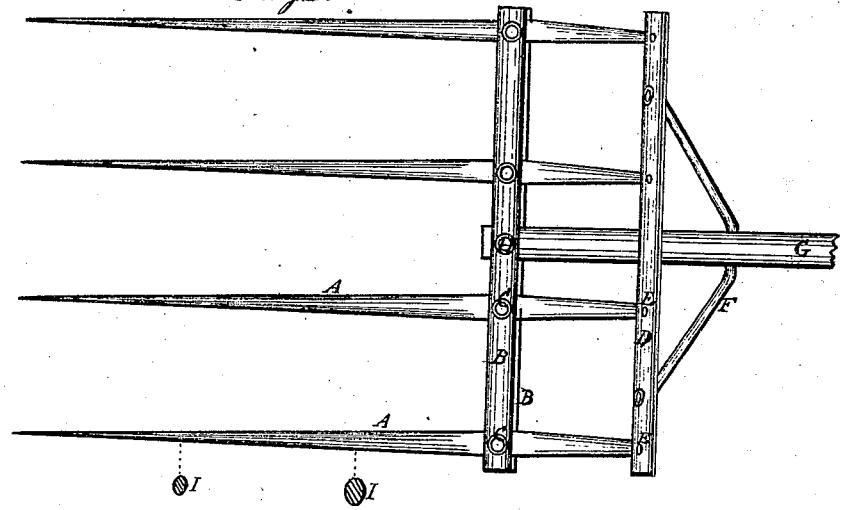
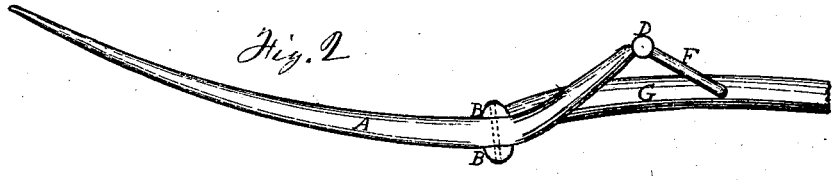

United States Patent Office.

FREDRICK DUNN, OF PULASKI, NEW YORK.

Letters Patent No. 100,382, dated March 1, 1870.

IMPROVEMENT IN BARLEY-FORKS.

The Schedule referred to in these Letters Patent and making part of the same

*To all whom it may concern:*

Be it known that I, FREDRICK DUNN, of Pulaski, Oswego county, in the State of New York, have invented certain new and useful Improvements in Barley and other Forks; and I hereby declare the following to be a full and exact description thereof, reference being had to the accompanying drawings forming part of this specification.

The nature or essence of my invention consists in fastening the tines together, by means of two bars, one arranged on each side of the tines, and secured by bolts or rivets passing through the bars and tines.

Also, in supporting the rear ends of the tines, and holding them in position by a bar and yoke, or rod to connect the bar to the fork-handle; and in securing the fore end of the handle to the tines by fastening it between the bars by a bolt or rivet.

In the accompanying drawings—

Figure 1 is a plan of the fork, with my improvements, and

Figure 2 is an elevation of one side.

In these drawings—

A A are the tines, which may be increased or diminished in number as desired, and made of wood in the form shown in the drawings, and connected by the bars B B, which are placed across the tines, one on each side, and fastened by bolts or rivets C C, which pass through the bars and tines, to hold them fast together.

The bar D is perforated, to receive the rear ends of the tines A, which are put into the perforations and fastened with pins E E.

The bar D is also perforated for the ends of the yoke or rod F, which passes through the handle G, and is fastened in the bar D, to connect them together firmly, and make a strong fork.

The fore end of the handle G passes in between the bars B B, and is secured by a bolt or rivet, H, which fastens the handle to the bars firmly, and completes the fork ready for use.

The tines A A are not round, but oval, as shown by sections I I in the drawing. This shape gives strength in the direction in which it is required, and makes the tines pass more freely between the stalks of the stubble.

This fork will be found very useful in gathering and removing all kinds of light grain and straw, &c. The rear portion of the tines between the bars B and D is turned up, as shown in fig. 2, to prevent the bundles of grain from slipping back onto the handle, as they are raised up.

Having described my improvements,

I claim—

1. The combination of the bars B B, with the tines A, when united as specified.

2. The bar D, brace F, and handle G, as specified.

FREDRICK DUNN.

Witnesses:
NATHAN B. SMITH,
H. N. WRIGHT.